United States Patent
Boner et al.

(10) Patent No.: US 7,223,347 B2
(45) Date of Patent: May 29, 2007

(54) APPARATUS AND METHOD FOR FILTERING FLUIDS

(75) Inventors: Mark C. Boner, Roswell, GA (US); Paula K. Gurney, Atlanta, GA (US)

(73) Assignee: WWETCO, LLC, Atlanta, GA (US)

(*) Notice: Subject to any disclaimer, the term of this patent is extended or adjusted under 35 U.S.C. 154(b) by 301 days.

(21) Appl. No.: 10/767,877

(22) Filed: Jan. 29, 2004

(65) Prior Publication Data
US 2004/0226897 A1 Nov. 18, 2004

Related U.S. Application Data

(60) Provisional application No. 60/502,383, filed on Sep. 12, 2003, provisional application No. 60/443,429, filed on Jan. 29, 2003.

(51) Int. Cl.
*B01D 24/46* (2006.01)

(52) U.S. Cl. ............... 210/795; 210/807; 210/350

(58) Field of Classification Search ........... 210/793, 210/807, 350, 351, 795
See application file for complete search history.

(56) References Cited

U.S. PATENT DOCUMENTS

| | | | |
|---|---|---|---|
| 3,180,825 A | | 4/1965 | Couvreur et al. |
| 3,289,845 A * | | 12/1966 | Weber ............... 210/231 |
| 3,965,000 A * | | 6/1976 | Mikule et al. ........ 210/661 |
| 4,076,625 A | | 2/1978 | Scholten et al. |
| 4,118,322 A | | 10/1978 | San Roman |
| 4,139,473 A | | 2/1979 | Alldredge |
| 4,776,962 A | | 10/1988 | Wakeman |
| 4,851,136 A | | 7/1989 | Fanqing et al. |
| 5,112,504 A | | 5/1992 | Johnson |
| 5,207,905 A | | 5/1993 | O'Brien et al. |
| 5,248,415 A | | 9/1993 | Masuda et al. |
| 5,470,470 A | | 11/1995 | Leyat |
| 6,517,712 B2 | | 2/2003 | Xia et al. |
| 6,517,724 B1 | | 2/2003 | Malone |
| 6,605,216 B1 * | | 8/2003 | Lederman ............ 210/269 |
| 6,641,737 B2 | | 11/2003 | Xia et al. |
| 2003/0111431 A1 | | 6/2003 | Dew, Jr. |
| 2004/0140256 A1* | | 7/2004 | Dew, Jr. ................ 210/274 |

FOREIGN PATENT DOCUMENTS

| DE | 101 01 313 A1 | 7/2001 |
|---|---|---|
| WO | WO 02/07849 A1 | 1/2002 |
| WO | WO 02/24306 A1 | 3/2002 |

* cited by examiner

*Primary Examiner*—Ivars C. Cintins
(74) *Attorney, Agent, or Firm*—Smith, Gambrell & Russell, LLP

(57) ABSTRACT

The present invention provides an apparatus and method for filtering fluids with a compressible filter media within at least a portion of a housing inwardly compressible.

6 Claims, 7 Drawing Sheets

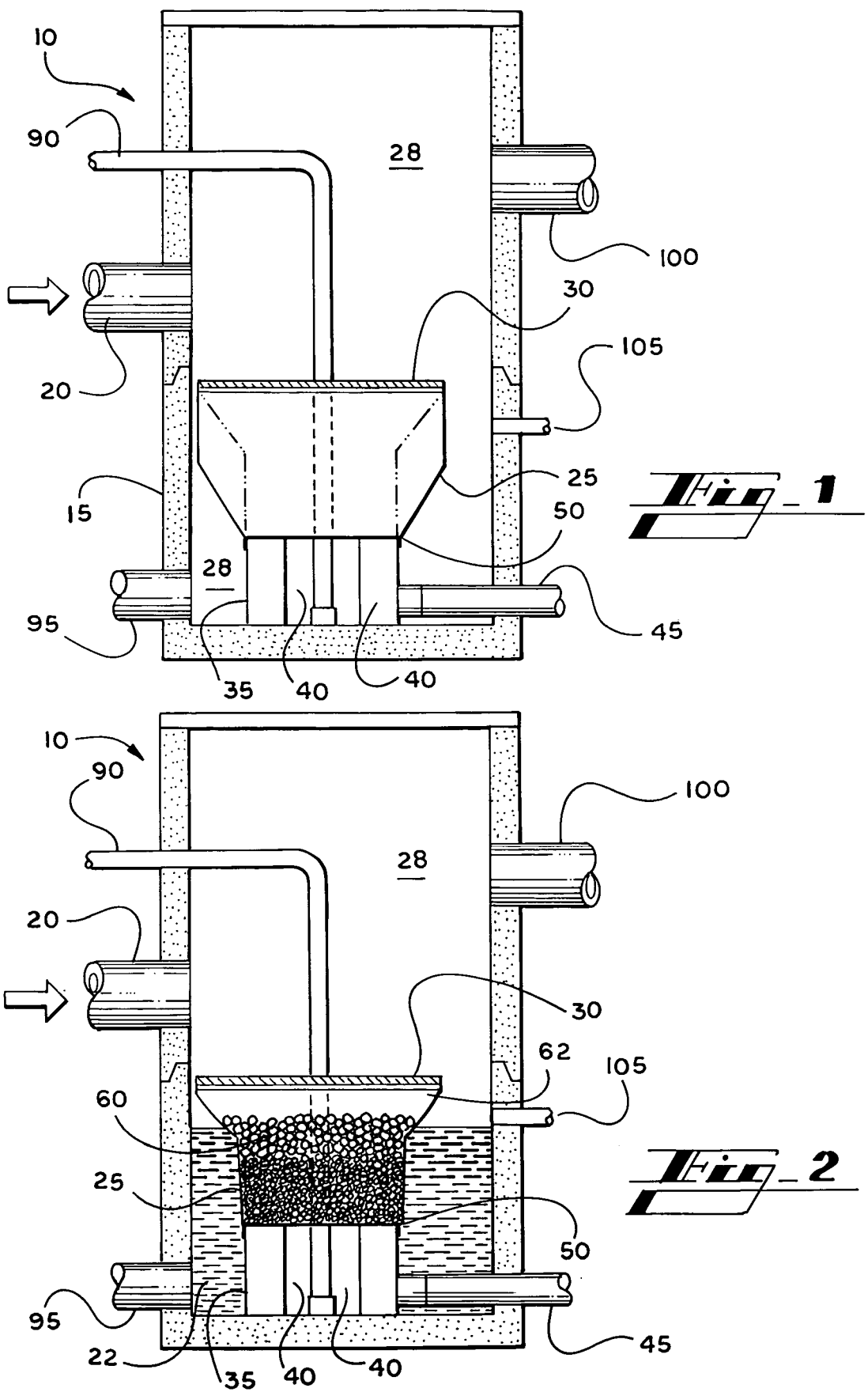

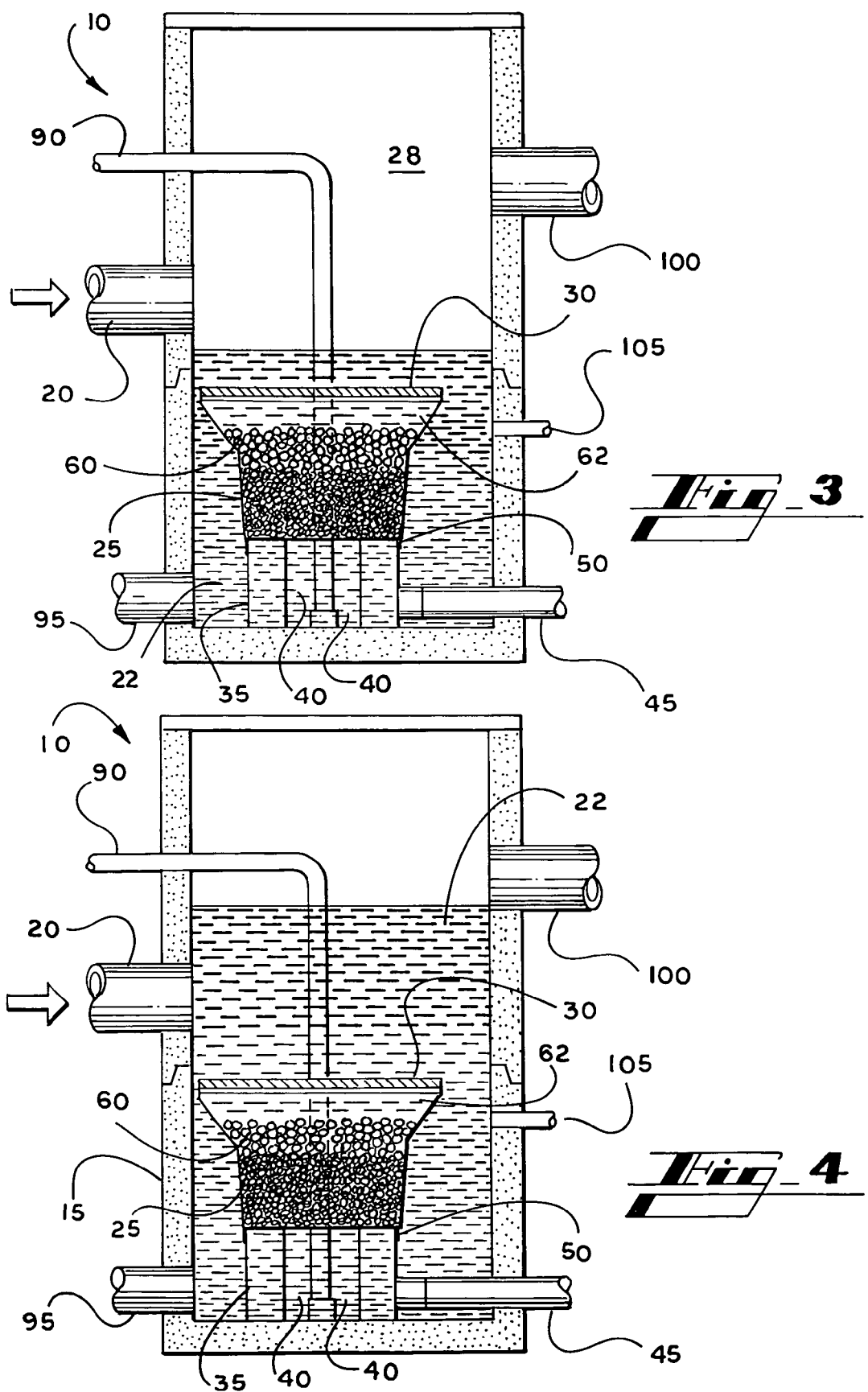

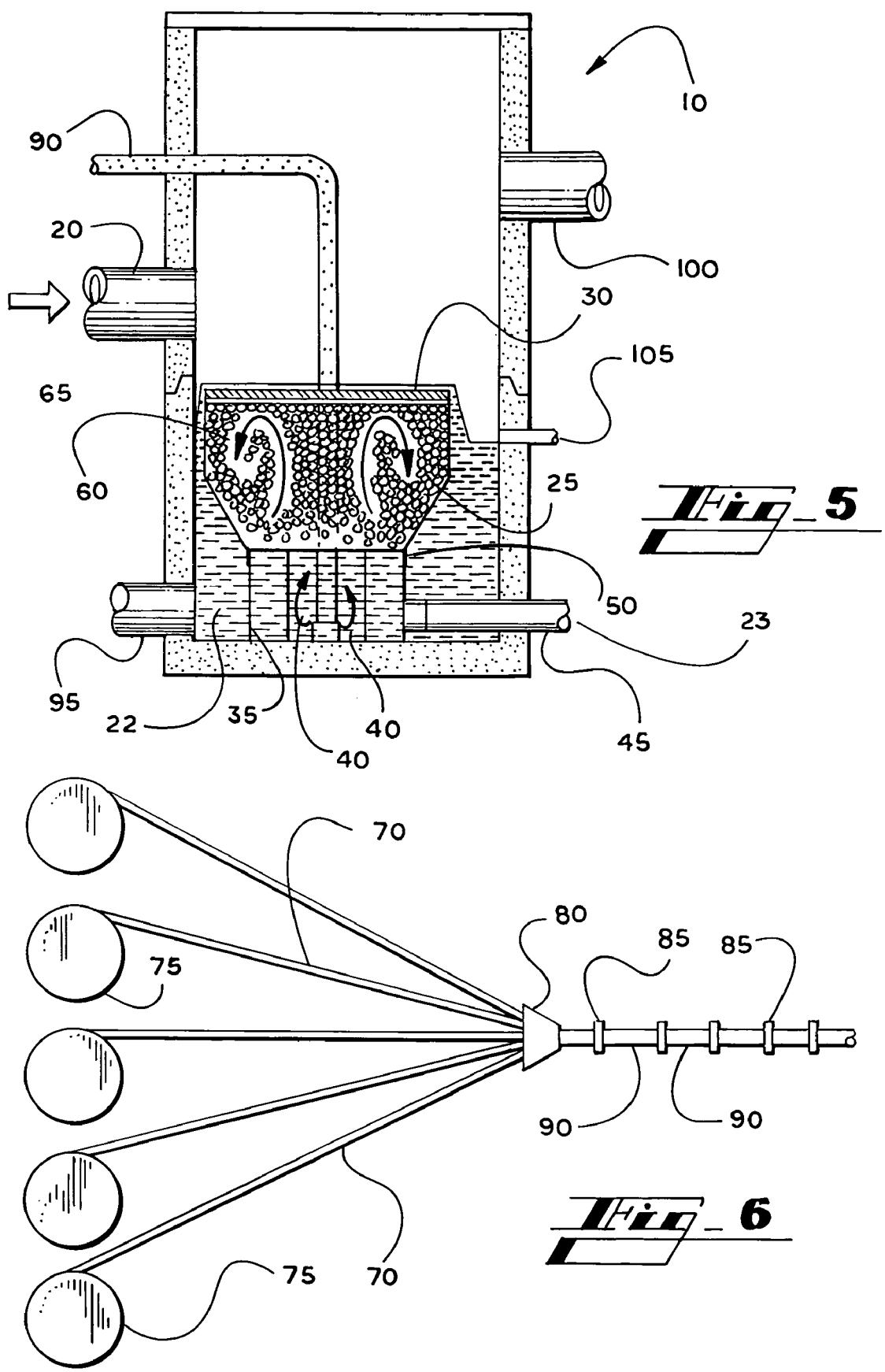

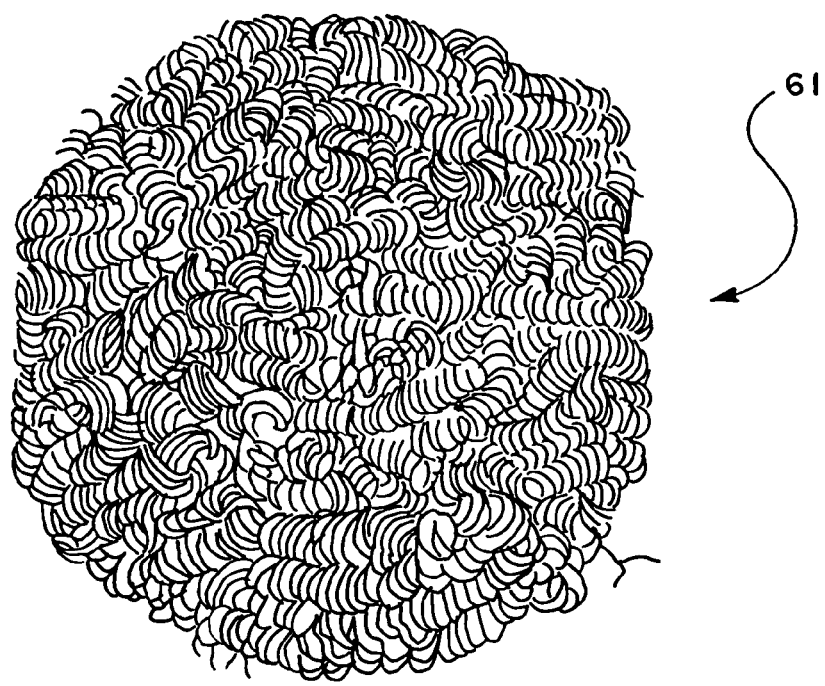
*Fig_7*
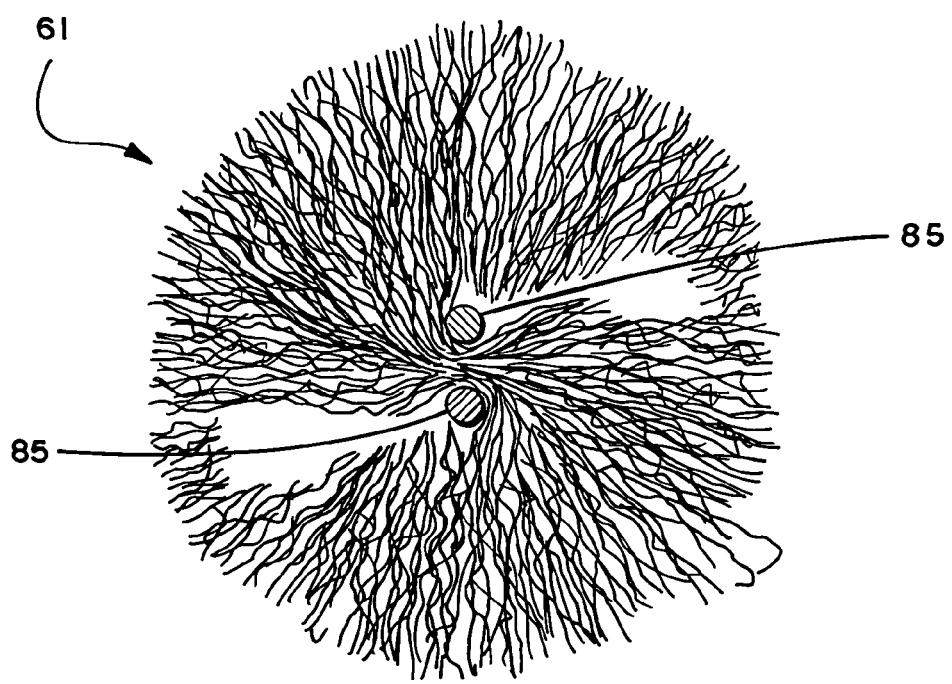
*Fig_8*

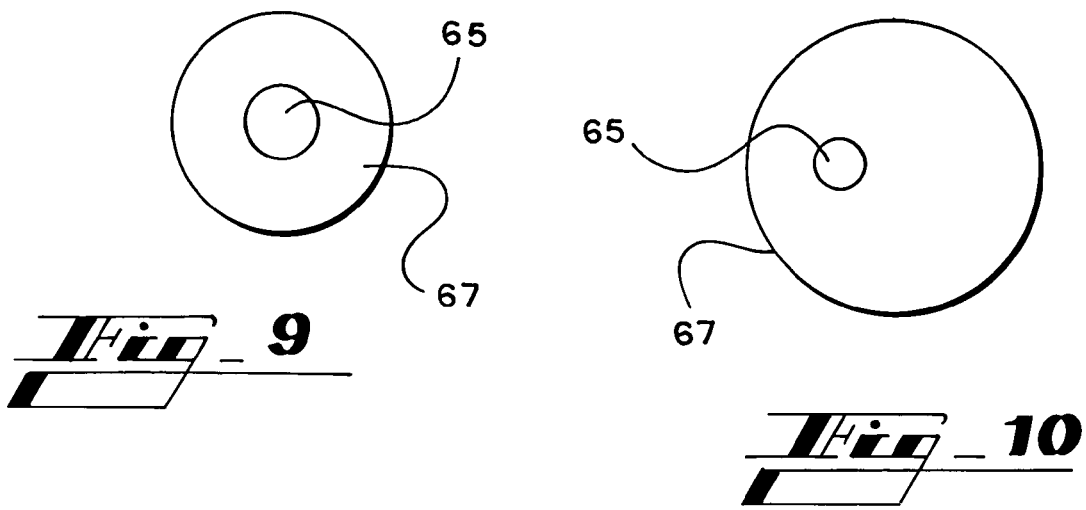
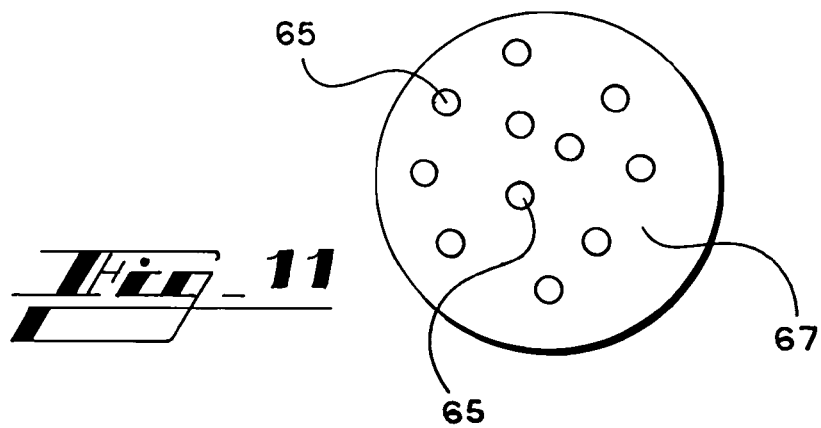
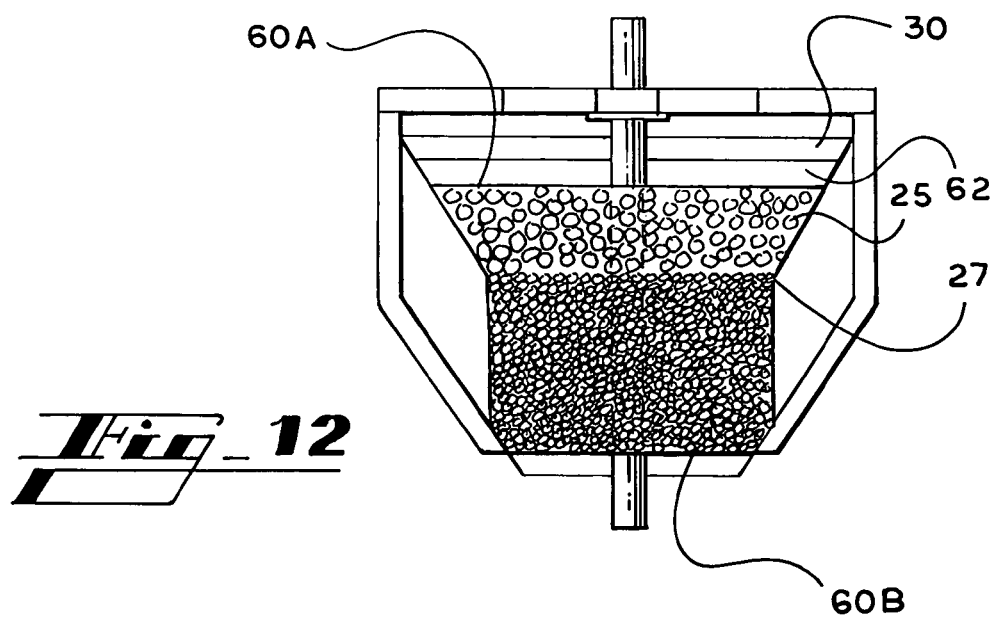

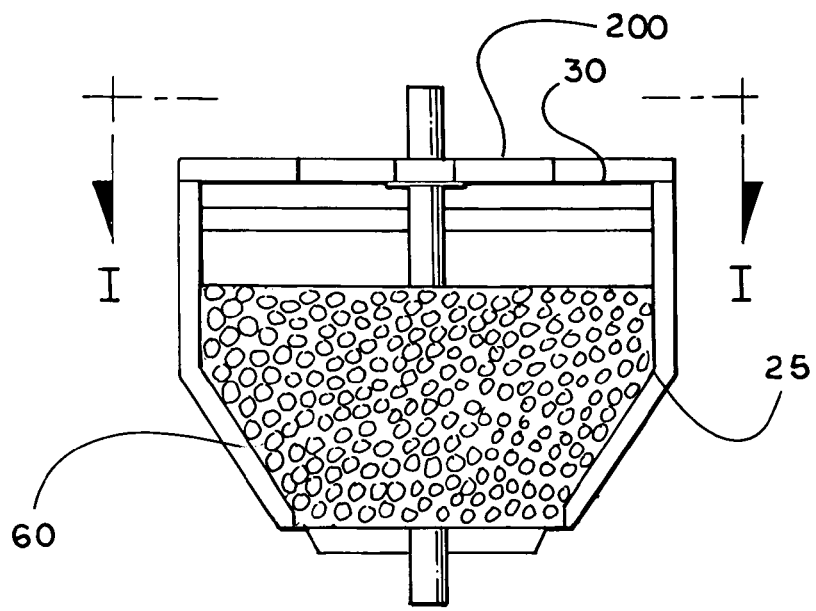
Fig_13A
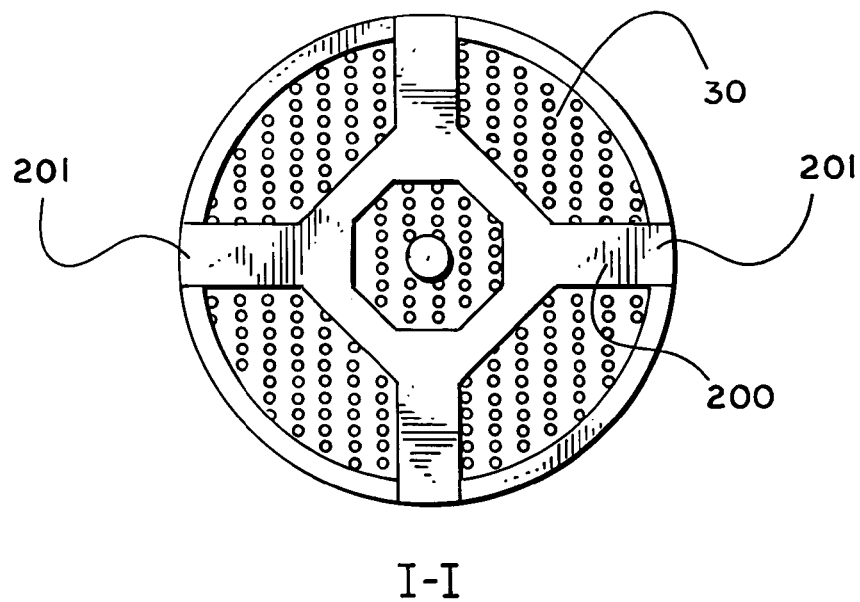
I-I
Fig_13B

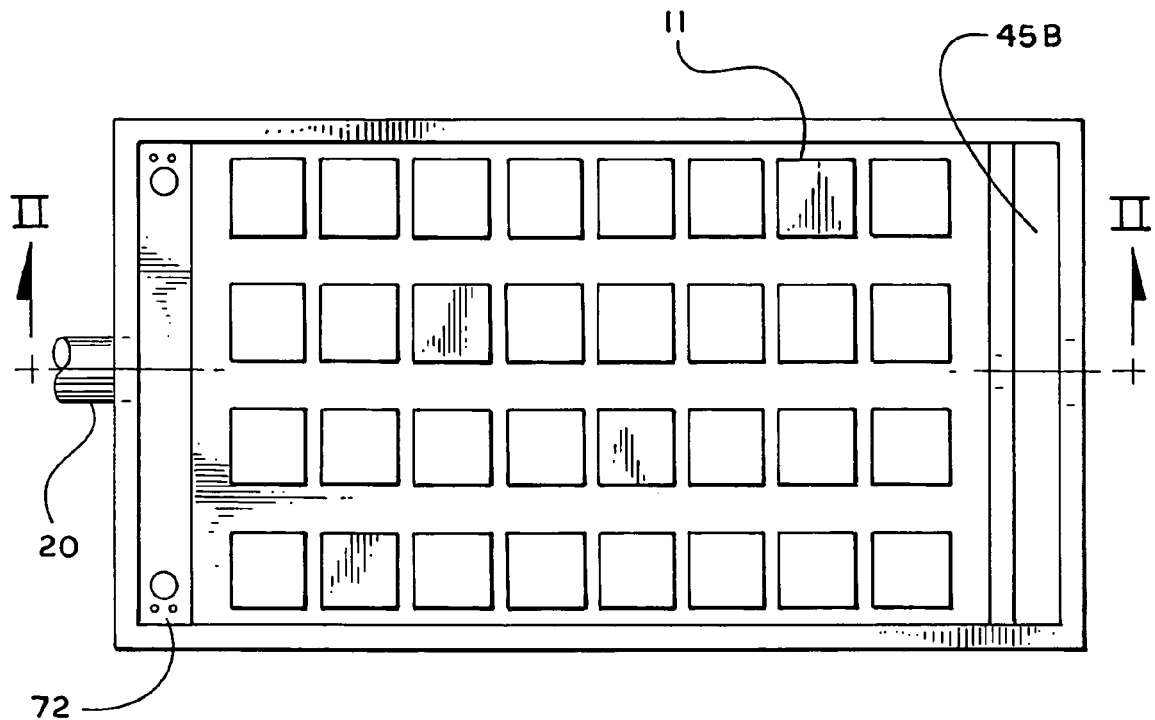
*Fig_14A*
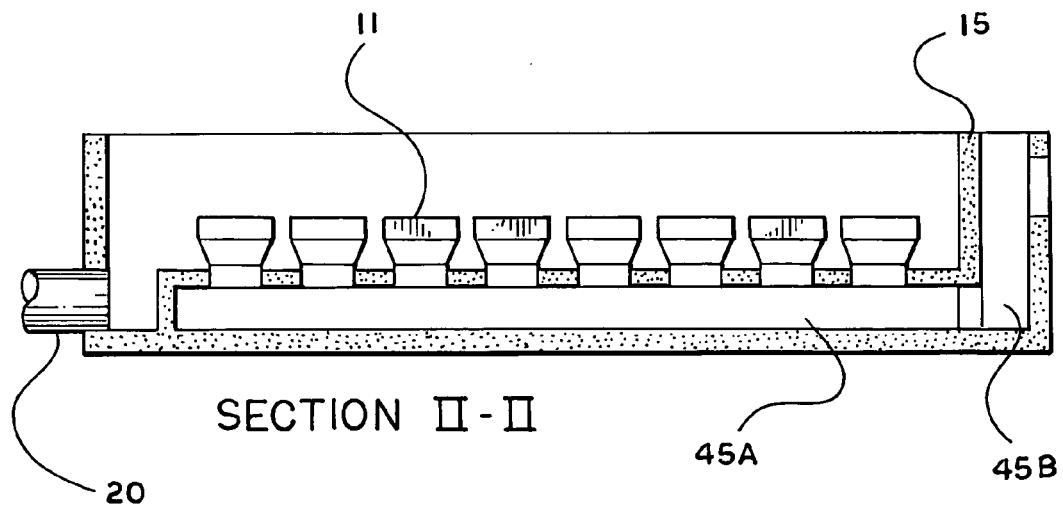
SECTION II-II
*Fig_14B*

APPARATUS AND METHOD FOR FILTERING FLUIDS

CROSS-REFERENCE TO RELATED APPLICATIONS

This application claims the benefit of priority of U.S. application Ser. No. 60/443,429 filed Jan. 29, 2003 and U.S. application Ser. No. 60/502,383 filed Sep. 12, 2003, both of which are incorporated herein by reference.

BACKGROUND OF THE INVENTION

The present invention relates to the filtering of particulates from fluids, particularly the removal of solids from water, using compressible filter media in a compressible housing.

Prior art techniques using compressible media have relied on mechanically actuated plates to externally compress filter media.

For example, U.S. Pat. No. 5,248,415 to Masuda et al. discloses the use of fibrous filter media compressed by a movable bottom plate in a bottom-up filtration apparatus.

U.S. patent application Publication No. US2003/0111431 discloses fibrous filter media compressed by a movable top plate in a bottom-up filtration apparatus. U.S. Pat. No. 4,776,962 discloses a fibrous filter media compressed by a movable top plate in a downflow filtration apparatus.

In such prior art apparatuses, the movable plate compresses the filter media within rigid containment walls during filtration and provides compression across the entire filter media bed. Compression of the media increases the filtering performance measured as percent removal and removal of smaller particulates; however, particulate rapidly builds up in the initial portion of the media bed and reduces the filter operation time. Filtering efficiency progressively decreases as a result of the particulate accumulation, and eventually filtering must be stopped to wash and dislodge the solid build up. The movable plate pressed against the media further inhibits the capacity of the initial portion of the media bed to remove particulates resulting in shorter filter operation time and less solid removal per unit of filter media. The washing operation requires that the movable plate be retracted so that air and washing fluid may be directed through the media to scrub and dislodge the solids. The media is re-compressed with the movable plate when filtering is restarted. The movable plates require close tolerance with the rigid containment walls to retain filter media and maintain efficient filter and backwashing operations.

Accordingly, there is a need for a filter apparatus and method that provides efficient filtration with compressed media that improves particulate capture with longer filter operation times, but eliminates the need for mechanically movable plates, close tolerance containment walls and associated mechanisms.

SUMMARY OF THE INVENTION

The present invention answers these needs by providing a filter apparatus with a movable filter media housing containing compressible filter media. In one embodiment the filter media housing is a flexible housing material. In other embodiments, the filter media housing may include hinged container walls, sliding mechanisms or similar movable housings for inwardly compressing filter media within the housing.

In an embodiment of the invention, a flexible housing houses compressible filter media within an open inner fluid retaining space of a filter apparatus. As the hydrostatic pressure of unfiltered fluid surrounding the housing exceeds the pressure within the housing, the housing and media therein are compressed. Different initial compression and corresponding particle size capture levels are achieved with different initial open inner fluid volumes.

In further embodiments of the invention, a first portion of the compressible media within the flexible housing is uncompressed by the filter media housing while a second portion of the media is compressed by the outer housing. In various embodiments a gap is also provided above the loose, uncompressed portion of the filter media to maximize the uncompressed state of the first portion. It is an object of the invention in such embodiments to provide at least two different compression zones so that the fluid being filtered achieves greater penetration through the uncompressed filter media portion to maximize particulate removal deeper in the filter media.

In embodiments of the invention, it is an object of the invention to compress the filter media within the filter media housing with the outer surrounding fluid being filtered.

It is a further object of the invention to provide for washing of compressible media without the need for mechanically movable plates or similar components through flexible outward expansion of the housing during washing of the media.

In another embodiment of the invention, a compressible filter media of multi-component fibers is provided for use within the flexible housing of the filter media. The specific gravity, resilience, chemical resistance, stiffness, and filtering performance of the compressible media can be adjusted to the fluid and filtering needs with the use of multi-component fibers.

In one embodiment, the compressible filter media comprises fibers with a nylon inner core and polypropylene sheath. In such embodiment, the fibrous lumps have low resilience and lower specific gravity.

In another embodiment, the compressible filter media comprises fibers with a polyester inner core and polypropylene sheath. In such embodiment, the fibrous lumps are heavier and more resilient.

In still other embodiments of the invention, a plurality of filter apparatuses of the present invention may be used to filter large amounts of fluid, such as in a basin or other large container within which the plurality of apparatuses are utilized.

BRIEF DESCRIPTION OF THE DRAWINGS

FIG. 1 is a schematic cross-sectional view of a single filter apparatus of the present invention showing a flexible housing for containing filter media in an embodiment of the present invention.

FIG. 2 is a schematic cross-sectional view of a filter apparatus of the present invention during initial filling with fluid to be filtered.

FIG. 3 is a schematic cross-sectional view of a filter apparatus of the present invention as the hydraulic head becomes greater upstream than in the downstream flow and the hydrostatic pressure of the unfiltered fluid compresses the flexible housing in an embodiment of the invention.

FIG. 4 is a schematic cross-sectional view of a filter apparatus of the present invention as influent level reaches an optional overflow pipe in an embodiment of the invention.

FIG. 5 is a schematic cross-sectional view of a filter apparatus of the present invention during backwash operation in an embodiment of the invention.

FIG. 6 is a schematic view of fiber being reduced from spools and bound for cutting into fiber media bundles in an embodiment of the invention.

FIG. 7 is a front perspective view of a filter media bundle in an embodiment of the invention.

FIG. 8 is a cross-sectional view of a filter media element including a hog ring/binding wire crimping and holding the center of the filter media bundle fibers in an embodiment of the invention.

FIG. 9 is a schematic cross-sectional view of a concentric bi-component fiber in an embodiment of the invention.

FIG. 10 is a schematic cross-sectional view of an eccentric bi-component fiber in an embodiment of the invention.

FIG. 11 is a schematic cross-sectional view a multi-component fiber in an embodiment of the invention.

FIG. 12 is a schematic cross-sectional view depicting first and second compression zones of compressible filter media in a filter media housing in an embodiment of the invention.

FIG. 13A is a schematic cross-sectional view of a filter media housing including uncompressed filter media and a backwash removal device in an embodiment of the invention.

FIG. 13B is a schematic top plan view of a backwash removal device along line I-I of FIG. 13A in an embodiment of the invention.

FIG. 14A is a schematic top plan view of a plurality of filter units within a large fluid containment in an embodiment of the invention.

FIG. 14B is a schematic cross-sectional view of a plurality of filter units along line II-II of FIG. 14A.

DETAILED DESCRIPTION OF THE INVENTION

The present invention provides an apparatus and method for filtering fluids with compressible filter media contained in a flexible housing. In the described embodiments, fluid outside the housing compresses the housing and filter media; however, it will be appreciated that a variety of external forces may be applied to the outer housing and compressible media to achieve the objectives of the invention in other embodiments. It will also be appreciated that although the invention is described in embodiments for top to down filtering of fluid, the apparatuses and components described herein may be positioned such that the filtration may occur in other directions, and repositioning is within the scope of the invention.

The present invention thus provides improved filtration, and is particularly adapted for the filtration of stormwater, drinking water and wastewater. Those skilled in the art will further appreciate that in other embodiments the present invention is adapted for use with a variety of fluids and filtering applications.

Referring to FIG. 1, in an embodiment of the present invention a filter apparatus 10 includes an outer fluid container 15. Outer fluid containment housings include concrete containers, earthen basins, natural water features (including a lake), and like environments in which fluid to be filtered may be contained. An influent pipe 20 provides fluid to be filtered into the outer container 15. It will be appreciated that the influent pipe 20 may be located in a variety of positions (such as above or below the top of the filter) and or/include a plurality of influent pipes 20.

Within the outer container 15 an upright filter media housing 25 is provided. FIG. 1 depicts the filter media housing 25 comprising a flexible membrane in both expanded and compressed embodiments to demonstrate compressibility of the housing. The top of the filter media housing 25 includes an upper perforated plate 30 to allow fluid to be filtered into the housing, as well as backwash fluid out of the housing, while retaining the filter media within housing (such as during backwash processes subsequently described).

A housing base 35 secures the filter media housing 25 at the bottom of the outer container 15.

In one embodiment, the base may include baffles 40 that direct filtered fluid to an effluent pipe 45 carrying filtered fluid from the filter housing 25 out of the containment 15. The baffles 40 may also direct air and make-up water to the center of lower perforated plate 50 during backwashing operations (FIG. 5).

Referring to FIGS. 14A and 14B, in other exemplary embodiments, the containment 15 may include a plurality of filter units 11 wherein the base may be a wall of an effluent channel/conveyance 45A or a piping network underlying one or more filter units 11. In such embodiments, the channel wall or piping serves as the base to support one or more filter units 11 is an upright position within the outer containment 15. The integrated filter unit 11 into the conveyance 45A may be provided without baffles 40.

In a large containment environment as shown in FIGS. 14A and 14B, the underlying effluent conveyances (or piping) 45A may all connect to a larger effluent conveyance 45B for carrying off filtered fluid. In other embodiments underlying conveyances 45A may be directed to other desired locations and conveyance points.

FIGS. 14A and 14B, also show that one or more backwash pumps 72 may be provided for removing backwash fluid from the containment 15 following the backwash process (subsequently described).

In embodiments utilizing a plurality of filter units 11, it will be appreciated that the containment 15 may include a large basin, natural feature, manmade containments and the like, where a large quantity of fluid is to be filtered. It will also be appreciated each of the filter units 11 includes compressible media 60 and a filter media housing 25 and operates as subsequently described with reference to a single filter unit.

Referring again to FIG. 1, between the upper plate 30 and base 35, the lower perforated plate 50 allows filtered fluid to exit the flexible housing 25. The lower perforated plate 50 also supports filter media 60 (FIG. 2) within the housing 25.

With further reference to FIG. 2 and FIGS. 7-11, compressible filter media 60 is housed within the housing 25 between the upper perforated plate 30 and lower perforated plate 50. Although the filter bundles disclosed in U.S. Pat. No. 5,248,415 to Masuda et al. and U.S. Patent Application Publication No. US2003/0111431 are particularly adapted for use as filter media 60 in the present invention, a variety of compressible fibrous filter elements may be used.

In certain embodiments, the fibrous media 60 of the present invention improves upon the prior art through the use of multi-component fibers where two or more synthetic materials are used in the same fiber to achieve the physical characteristics such as specific gravity, resilience, chemical resistance, stiffness, fiber diameter, and the like. In other embodiments, the filter media fiber may further include components with specifically desired performance characteristics such as specific pollutant removal capabilities. For example, oleophilic fiber components may be used in embodiments for attracting oil from fluid being filtered or hydrophobic fibers may be used to encourage water filtration. Those skilled in the art will appreciate that a wide variety of other combinations of components in the filter media may be adapted for use in the present invention depending on the desired performance the type of fluid and pollutants being filtered.

In one embodiment to achieve a chemically resistant fibrous lump of low resilience and lower specific gravity, the fiber is manufactured with a nylon inner core and polypropylene outer cover.

In another embodiment to obtain a heavier, more resilient lump 61 (FIGS. 7 and 8), the fiber is manufactured using a polyester inner core with a polypropylene sheath.

Referring to FIG. 9, in one embodiment the multi-component fiber is a bi-component fiber, wherein an inner fiber 65 and an outer fiber 67 (sheath) are provided/extruded in a generally concentric configuration.

Referring to FIG. 10, in another embodiment the components are generally eccentric with the inner component 65 being off-center. In such embodiment, subsequently described, the eccentric configuration permits heating of the fiber to produce crimping based on the resultant heat distortion.

It will be appreciated that in alternative embodiments a plurality of inner fibers 65 may be contained in a sheath 67, such as shown in FIG. 11. In such embodiments, the plurality of inner fibers 65 may be the same or different component materials. It will also be appreciated that one or more additional outer sheaths could be provided in alternative embodiments to achieve specific pollutant removal as well as exhibit desired physical characteristics.

In various embodiments, core and sheath materials may include any combination of the following, or other synthetic fibers: polyester (PET), coPET, polylactic acid (PLA), polytrimethylene terephthalate, polycyclohexanediol terephthalate (PCT), polyethylene napthalate (PEN); high density polyethylene (HDPE), linear low density polyethylene (LLDPE), polyethylene (PE), polypropylene (PP), PE/PP copolymer, nylon, polyvinylidene fluoride (PVDF), polytetrafluoroethylene (PTFE) and polyurethane.

Referring to FIG. 6, the fibers used as filter media 60 are initially in the form of loosely packed elongated fibers 70 on spools 75.

With continuing reference to FIG. 6, several bundles of elongated fibers 70 are brought together from the spools 75 using a reducing device 80. The device 80 reduces the overall size of the fibers while a hog ring fastener/binding wire 85 or other similar clamp is applied. After the clamps are applied, the fiber bundles are cut at cut lines 90 between each clamp 85 to form a fibrous lump 61 (FIGS. 7 and 8).

In embodiments of the invention, the multi-component fibers can be crimped mechanically and/or by heating.

A mechanical crimping machine is used in one method. Following extrusion, the fibers are mechanically crimped along the length of the fibers to produce crimped fiber. A second method is to produce the multi-component fiber 65 such that the core materials are placed eccentrically from the sheath 65 (FIG. 10). When heat is applied, the fiber materials distort differently resulting in a helically shaped crimp. The amount of heat applied is dependent on the fiber materials.

Referring again to FIG. 2, during initial filling, fluid 22 to be filtered enters from the influent pipe 20 and fills the void 28 between the outer container 15 and flexible housing 25. The air inlet 90 is off. The drain 95 is closed.

With continuing reference to FIG. 2, initial compression of the filter media is adjustable and can be set by the level of fluid and media inside the filter media housing 25 at the beginning of the filter run. After backwashing (see FIG. 5 and related description), the media is in a relatively uniform suspension with density equal to the number of filter media bundles 61 per volume of fluid within the flexible membrane 25. A lower fluid level inside the flexible membrane 25 will result in a greater density of filter media 60 and thus a greater initial compression when the void space 28 begins to fill and the flexible membrane 25 compresses the filter media 60. A higher fluid level left inside the flexible membrane 25 at the beginning of the filter cycle will result in a lower initial compression. Initial compression is shown in FIG. 2. During this initial filling, it will be appreciated that the flexible housing 25 is relatively expanded until the hydrostatic pressure outside the housing 25 exceeds the pressure within the housing 25.

With further reference to FIGS. 3 and 12, fluid 22 rises above the upper perforated plate 30 of the flexible membrane housing 25, the fluid 22 enters the top perforated plate 30 for filtering by the filter media 60. The fluid being filtered 22 passes downward through the filter media 60 with particulates being removed from the fluid. It will be appreciated that, in general, larger particulates are removed nearer the top of the filter bed with smaller particulates removed deeper in the media bed and as solids begin to bridge the voids between the media fibers a matting takes place resulting in removal of both fine and larger particles in the upper media zone (FIG. 12). It will also be appreciated that less compression with media open to the fluid being filtered 22 results in the upper zone of the media bed and more compression results in the lower zone. Because of the compression zones, the filter bed becomes more effective in removing a larger amount of particulates per unit of media and protect the finer particulates from passing through the filter. The compression differential described above between the upper and bottom zones of the media bed is created in the initial compression developed after backwashing or during initial filter operation.

With continuing reference to FIG. 12, initial compression shows the lower filter media bed 60B to be compressed inward by the filter media housing 25. The upper filter media bed 60A is relatively uncompressed as the housing 25, in embodiments where the housing is a flexible membrane, remains tight and relatively inflexible at the upper portion of the housing 25 between upper plate 30 and a taper point 27.

In other embodiments the filter media housing 25 may include a plurality of components to achieve the similar effect of multiple compression zones. For example, the upper portion of the housing 25 may comprise a rigid element connected to a lower membrane (lower portion of housing 25). The upper filter media 60A in such embodiment would be uncompressed from the external fluid as the rigid upper portion would not flex inward. The flexible lower portion of the filter membrane would be compressible by the outer fluid to generate compressed lower bed 60B.

In still other embodiments, the housing 25 could include a lower housing portion with hinged plate walls instead of a flexible membrane. In such embodiments, the hinged wall could be provided with a hinge near taper point 27, wherein the upper portion of the housing 25 would be a relatively rigid component. Such walls could be provided in a variety of shapes, including flat wall plates with leak-resistant membranes or materials joining one plate to the next plate. Sliding mechanisms may also be used for a portion of the housing to compress inward. It will be appreciated that all such embodiments permit the external fluid pressure to compress the lower portion of the housing and the lower filter media bed 60B inward.

In embodiments where the housing 25 is flexible, it may be constructed of single or multi-ply membranes of chlorosulfonated polyethylene (Hypalon), polyvinyl chloride (PVC), rubber, viton, polypropylene, polyethylene, vinyl, neoprene, polyurethane and woven and non-woven fabrics. In embodiments where rigid materials are used, such as those including an upper rigid portion or including pivotable or sliding housing walls, construction materials could include steel, stainless steel, other metals, reinforced and unreinforced plastics. It will be appreciated, however, that the filter media housing 25 may be constructed of any suitable material depending on the desired filtering use, types of fluids being filtered, desired corrosive characteristics and the like.

It will also be appreciated that although the present invention is shown in embodiments with external fluid pressure generating compressive force against the housing 25 and filter media 60, other external forces may also, or additionally, be used to compress the lower filter media bed 60B. For example, in other embodiments, the side walls of the housing 25 may be actuated in an inwardly pivotable or sliding manner through mechanical, electrical, hydraulic and similar operation. In other embodiments, inflatable components may be provided external to the housing and inflated in a balloon-like manner to press against the housing and compress the filter media.

Referring again to FIG. 12, the top surface of the filter media bed 60 includes space 62 (see also FIGS. 2-4) that is open and untouched by the upper perforated plate. In such embodiment, the upper filter media zone 60A remains uncompressed by not only the housing 25, but also avoids external top to down compression from the upper plate 30 because of spacing 62. It will also be appreciated that the initial compression with relatively uncompressed upper filter media bed 60A with an open surface and the compressed lower filter media bed 60B will result in greater particulate penetration than if the upper filter media bed 60A were compressed or the entire bed were compressed. Finer particulates may therefore be captured in the lower media bed 60B as greater penetration is achieved. It is thus an object of the present invention to maximize fluid filtering efficiency.

Referring further to FIGS. 3 and 4, as filtration proceeds and more particulates are removed, the hydraulic head differential across the filter becomes greater (FIG. 3 to FIG. 4) causing greater compression in the lower zone 60B to prevent smaller particulates from passing through. There is also a slight upheaval of upper media zone 60A as the lower zone 60B compresses to allow more particulates to enter the filter media 60. Compression of the filter media 60, as described with reference to FIGS. 3 and 4, thus improves filtering as increasingly smaller and more particulate is removed in the filter media bed 60.

In embodiments of the invention, the flexible housing 25 shape is also generally wider at the upper portion than at the lower portion of the housing 25. It will be appreciated that in such embodiments, less filter media 60 is required at the bottom as the filter bed narrows to direct the fluid out of the housing 25 and the fluid 22 being filtered is "cleaner" toward the bottom. Further, the generally tapered embodiment provides additional filter benefits as the media is more loosely packed near the more "open" upper portion and is more densely packed nearer the bottom portion of the housing.

In other embodiments, it will be appreciated that in addition to or instead of tapering housing shapes, different compression levels may be created by higher media concentrations with lower inner fluid levels. Different filter materials and combinations of materials with desired physical properties may also be used to achieve different compression levels, including the layering of filter media with different densities, compressibility or other desired physical and performance characteristics to achieve a desired filter bed that may include one or more zones.

FIG. 3 shows the hydraulic head in the upstream portions outside the flexible housing 25 becoming greater than the downstream hydrostatic pressure. The hydraulic head differential is due to both the flow stream through the filter media 60 and the build-up of particles on the filter media 60, resulting in increasing upstream fluid level as solids are removed (FIGS. 3 and 4). As the hydrostatic pressure outside the filter media housing 25 becomes greater than the hydrostatic pressure inside the housing 25, the housing 25 is further compressed inward, thereby further compressing the filter media 60. In embodiments of the invention, the housing 25 and filter media 60 are compressed in a direction non-parallel, including generally perpendicular in some embodiments (FIGS. 2-4 and 12), to the direction of the fluid flow through the filter media. And as also shown in FIG. 12, and previously described, a plurality of compression zones may be established, such as lower portion of the filter media bed 60B being compressed to remove finer particulates and protect the filter media bed 60 from particle breakthrough.

Referring to FIG. 4, an embodiment of the invention is shown when the filtration cycle has reached its latter stages and/or during a period of peak upstream fluid flow. The latter stage of the filtration cycle is reached when the filter media 60 captures its maximum particle load, and the depth of fluid 22 over the top of the upper perforated plate 30 reaches it maximum fluid level.

In one embodiment of the invention, when the fluid 22 over the filter apparatus 10 reaches it maximum fluid level, closing the influent 20 stops the filter cycle. In this embodiment the backwashing cycle (FIG. 5) is initiated.

In another embodiment of the invention where an overflow pipe 100 is provided, the filter cycle continues whereby fluid 22 is both filtered through the media bed 60 and a portion of the fluid bypasses the filter and is discharged from the outer housing 15 along with the filtered effluent 45. It will be appreciated that filtration of wet weather flows, such as treatment of stormwater or treatment of wet weather discharges from sewer systems, can be designed to remove a specific particle load according to a desired need for a particular event, and after the load is reached or the design flow rate is reached, excess flows and excess particle loads may be discharged from the filter.

FIG. 5 shows the filter media 60 being backwashed to remove particulate build up. During a backwash operation fluid entry from the influent pipe 20 is stopped. Make-up water 23 is introduced into the filter effluent pipe 45 or to an open-close connection valve to the outer section of the housing base portion 35. A backwash outlet, such as a backwash pump discharge 105 connected to a backwash pump 72 (FIG. 14A), can be used to remove the backwashed particles from the containment housing 15 or the backwashed fluid can be removed from the containment 15 by opening a drainpipe 95. During backwash the fluid level within the containment housing 15 is lower than the water level within the filter media housing 25 causing the housing 25 to expand.

In the backwash cycle, an air inlet 90, provides air from a blower at the base portion 35 or under the lower perforated plate 50. It will be appreciated that the backwashed fluid containing the concentrated particulates from the fluid to be filtered 22 is typically transferred to a sanitary sewer system for further treatment, removed by vacuum vehicle equipment for transport to other facilities for further process or by further processing the backwash fluid on-site by other concentrating and dewatering processes.

The air from the air inlet 90 enters the center section of the base 35 and rises through the center of the lower perforated plate 50 and up through the center of the filter media 60. The upward center air flow causes the filter media 60 to circulate within the expanded filter media housing 25 during the washing cycle. Circulation of the filter media 60 causes the media 60 to collide with the upper perforated plate 35 and with other media bundles 60, helping particulates to dislodge. The lower specific gravity of the air/fluid mixture or the hydraulic head of the backwash water within the housing 25 causes the fluid level within the housing 25 to rise and flow over the upper perforated plate 30 into the void 28 inside of the outer container 15 and outside the housing 25. The backwash fluid exits containment 15 by either gravity drainage through drain 95 or pumping through outlet 105.

Another embodiment, shown in FIGS. 13A and 13B, includes backwash removal device 200 having troughs 201, placed on the upper perforated plate 30. In this embodiment, troughs 201 form a donut-shape around the center of the air inlet on the upper perforated plate 30. The troughs 201 receive the backwash fluid with concentrated particulates as the backwash fluid rises above the perforated plate 30 (through the action of centrally directed air) and is directed through the radial troughs 201 to the void 28, thus minimizing particulate recirculation during the backwash mode. It can be appreciated that the quicker the backwash fluid is separated from the circulating media, the less make-up water is required to clean the filter and the shorter the backwashing cycle time. It can also be appreciated that water level in the center of the upper plate 30 is at the highest level caused by the central rising air and this hydraulic head is used to drive the backwash fluid through the radial toughs 201 into the void 28 for removal.

In another embodiment, a drain 95 is provided at the bottom of the outer container 15. The drain 95 can also be opened to remove fluid from inside the outer container 15, such as following backwashing. Further, the void 28 between the outer container 15 and housing 25 can be cleaned, and the drain 95 opened to remove the cleaning fluid. It will be appreciated that a plurality of drains 95 may also be provided.

In another embodiment, the backwash removal device 200 can be designed with troughs 201 being enclosed, for example, using pipes to carry backwash water out of the outer containment 15. It can be appreciated that in certain outer containment structures such as earthen basins with permanent lower water levels or natural water features (such as lakes), the outer containment 15 would not be drained and it may be desired that backwash water be discharged outside of the outer containment 15. It can be further appreciated that in this application the compressible media housing 25 may be actuated inwards or outwards by an inflatable balloon or similar alternative method as described previously. It can be further appreciated that in an application where the outer containment 15 is a natural water feature with a fixed water level, the fluid inlet to the filter may be closed when backwashing occurs.

Accordingly, while the invention has been described with reference to the structures and processes disclosed, it is not confined to the details set forth, but is intended to cover such modifications or changes as may fall within the scope of the following claims.

What is claimed is:

1. A method for filtering fluid comprising:
providing fluid to be filtered against a first side of a flexible membrane opposite from a second side of the flexible membrane that includes compressible filter media;
compressing the flexible membrane with the fluid to be filtered from the first side to compress the filter media on the second side of the flexible membrane; and
filtering the fluid to be filtered through the filter media on the second side of the flexible membrane to remove solid particles from the fluid to be filtered, wherein the filter media includes detached fibrous bundles.

2. The method of claim 1 further comprising:
agitating the filter media to dislodge solids adhering to the media after filtering fluid through the media; and
removing effluent containing solids dislodged during the agitating of the filter media by guiding expelled backwash fluid away from reentering a housing.

3. The method of claim 1 wherein the filter media is included in a bed of filter media, the bed including at least two different compression zones.

4. The method of claim 3 wherein at least one compression zone is uncompressed by the flexible membrane.

5. The method of claim 1 further comprising:
compressing and increasing density of at least a portion of the filter media in a direction non-parallel to the direction of the flow of fluid to be filtered through the filter media by overcoming hydrostatic pressure of the fluid within a housing;
filtering the fluid through the media to remove solid particles; and
agitating and circulating the filter media to backwash the solid particles from the media.

6. The method of claim 5 wherein elevated backwash fluid is expelled through an upper perforated plate in the housing that includes at least one trough adjacent to the plate that directs elevated backwash fluid from reentering the housing through the plate.

* * * * *